Patented July 29, 1952

2,605,275

UNITED STATES PATENT OFFICE 2,605,275

CATALYTIC CONVERSION

Kenneth K. Kearby, Cranford, and James F. Black, Roselle, N. J., assignors to Standard Oil Development Company, a corporation of Delaware No Drawing. Application October 23, 1948, Serial No. 56,248

6 Claims. (Cl. 260—449.6)

This invention relates to the catalytic conversion of carbon oxides with hydrogen to form valuable synthetic products. More specifically, the invention is concerned with improved catalysts and methods of operation for the catalytic synthesis of normally liquid hydrocarbons and oxygenated compounds from CO and $H_2$.

The conventional hydrocarbon synthesis processes may be divided into two broad classes, depending on the type of catalyst used and the character of reaction products obtained. One class comprises reactions carried out at relatively low temperatures of about 350°–450° F. and relatively low pressures of about 1–10 atm. abs. in the presence of catalysts of which cobalt is a typical representative to form predominantly saturated paraffinic liquid and solid hydrocarbons from which highly valuable diesel fuels and lubricating oils but only low octane number motor fuels may be obtained. The other class of processes employs iron type catalysts at higher temperatures of about 450°–800° F. and higher pressures of about 3–35 atm. abs. to obtain a predominantly unsaturated product from which highly valuable motor fuels having satisfactory octane ratings may be recovered. Also in this class of processes, pressures of up to 100 atms. or higher may sometimes be used if high yields of oxygenated products are desired. The present invention is chiefly concerned with the high temperature, high pressure reactions using iron type catalysts.

Active iron catalysts are usually prepared by the reduction of various iron ores or precipitated iron oxides as well as by the decomposition of iron carbonyls. The catalytic activity of the iron may be enhanced by the addition of such promoters as various compounds of alkali metals or the oxides of chromium, zinc, aluminum, magnesium, manganese, the rare earth metals, and others, in small amounts of about 1–10%. It has also been suggested to deposit these iron catalysts in inert or active carriers such as siliceous materials, particularly kieselguhr, pumice, synthetic silica gel, or hydrated alumina.

The last-mentioned catalysts, that is those supported on carriers, have been found to be of particular interest in connection with synthesis reactions employing the so-called fluid catalyst technique wherein the synthesis gas is contacted with a dense turbulent bed of finely divided catalyst fluidized by the gaseous reactants and products and which permits continuous catalyst replacement and affords a greatly improved temperature control of the highly exothermic and temperature-sensitive synthesis reaction. The adaptation of the hydrocarbon synthesis to the fluid catalyst technique has introduced a new factor in the rating of synthesis catalysts. While total liquid yield as determined by activity (percent conversion) and selectivity (ratio $C_4+$ higher hydrocarbons: $C_1+$ higher hydrocarbons), olefin formation, and catalyst stability are the essential characteristics determining the utility of fixed bed synthesis catalysts, the fluid technique requires, in addition, ease of fluidization. None of the prior art catalysts complies satisfactorily with these requirements. Unsupported iron catalysts, while exhibiting high activity and selectivity, have poor fluidization characteristics mainly due to their high bulk density. The known carrier catalysts have superior fluidzation characteristics but fall short with respect to activity and selectivity. This situation has stimulated extensive research to develop a new type of synthesis catalyst of equal utility for fixed bed and fluid catalyst techniques. The present invention includes such a new development.

It is, therefore, a principal object of the present invention to provide a process for synthesizing hydrocarbons and oxygenated compounds from hydrogen and oxides of carbon in the presence of an improved synthesis catalyst.

It is a more specific object of the invention to provide an improved hydrocarbon synthesis process carried out in the presence of a carrier catalyst having utility for both fixed bed and fluid operation.

A further object of the present invention is to provide a synthesis process of the type specified which is carried out in the presence of an improved iron type catalyst supported on a carrier material.

Another object of the invention is to provide means for improving the operation and efficiency of the catalytic synthesis of high octane motor fuels from CO and $H_2$, employing the fluid catalyst technique.

A still further object of the invention is to provide improved catalysts for hydrocarbon synthesis, having utility for both fixed bed and fluid operation.

Other and further objects and advantages will appear hereinafter.

It has been found that these objects may be accomplished quite generally by carrying out the synthesis reaction in the presence of a catalyst which comprises the oxide of trivalent iron, that is $Fe_2O_3$, in combination with oxides of one or more bivalent metals other than iron. Reduction products of these oxide composites may likewise be used. Investigations indicate that the superior qualities of these catalysts are due to the formation of particularly active spinel-type compounds having the general formula $Me^{++}Fe_2^{+++}O_4$, wherein $Me^{++}$ is a bivalent non-iron metal and $Fe^{+++}$ is trivalent iron. Bivalent metal components are, therefore, selected from those metals and metal compounds which, on the bases of their chemical and physical characteristics, are capable of forming spinel-type compounds with the oxide of trivalent iron. Examples for such bivalent metals are Mg, Zn, Mn, Cd, the alkaline earth metals, Be, Cu, etc. Further, it has been found that best results are obtained when the bivalent metal component is present in proportions at least sufficient to convert the total amount of trivalent iron present into a spinel-type compound. The bivalent metal component, therefore, is preferably used in amounts at least approaching or exceeding equimolecular proportions with respect to the trivalent iron oxide; larger amounts of bivalent metal component act as diluent or carrier without adversely affecting the activity of the spinel-type combination proper. Therefore, by using an excess of a bivalent component giving a relatively low bulk density such as MgO, catalysts of excellent utility for fluid solids operation may be prepared.

The bivalent non-iron metals mentioned above give with trivalent iron oxide particularly when used in spinel-forming proportions, composites having a high synthesizing activity at least approximating and mostly surpassing that of pure iron catalysts including magnetite which is a naturally occurring iron spinel having the formula $Fe^{++}Fe_2^{+++}O_4=F_3O_4$. However, particularly good results are obtained when using Mg and/or Zn as the bivalent metal component. Materials comprising oxide composites of trivalent iron with at least spinel-forming proportions of Mg and/or Zn, or reduction products of these oxide composites are, therefore, the preferred synthesis catalysts. As indicated above the bivalent component of the catalyst may comprise oxides of one or more of the bivalent metals described.

The addition of a promoter and a stabilizer greatly enhances the activity of the catalysts. Preferred promoters are those obtained by the addition, to the original catalyst composite, of compounds of potassium, such as KOH, $K_2CO_3$, $KNO_3$, KCl, etc. Similar compounds of other alkalis, such as Na, and Li, or of Ba and Ca, as well as oxides of such elements as Al, Si, Cu, Mn or Cr may be added as promoters. Useful stabilizers may be derived from the oxides of metals of the right hand side (transition series) of groups I, II and III of the periodic system or certain non-acidic oxides. CuO has been found to be particularly suitable for this purpose. The principal function of the promoter is to increase catalytic activity while the stabilizer is added to prevent deactivation of the catalyst.

The catalysts may be prepared by methods of coprecipitation, impregnation, wet mixing, etc. in any conventional manner, followed by drying, pilling and roasting at temperatures of about 800°–1600° F. to obtain the catalyst in the oxide form which, if desired, may be reduced with a reducing gas, preferably hydrogen, at temperatures of about 600°–1800° F. Satisfactory results are obtained with catalysts containing, prior to reduction, from about 10 or 20%, to 80%, preferably about 30–80%, by weight of $Fe_2O_3$ when magnesium oxide is the bivalent component, and from about 5–65%, preferably 25–50% by weight of $Fe_2O_3$ when zinc oxide is the bivalent component. The proportions of $Fe_2O_3$ in combination with other bivalent components vary depending on the molecular weights involved. Promoter and stabilizer may be added in proportions varying from 0.1–10% and 1–20%, respectively, based on the composite catalyst. Excellent yields of valuable liquid hydrocarbons have been obtained for example with a catalyst composed as follows:

|  | Per cent |
|---|---|
| MgO | 54 |
| $Fe_2O_3$ | 40 |
| CuO | 5 |
| $K_2O$ | 1 |

A typical method suitable for preparing catalysts useful in the process is as follows:

Magnesia is mixed with a solution of ferric nitrate. Ammonium hydroxide may be added to ensure complete precipitation. The magnesia with ferric hydroxide precipitate is washed and then mixed with solutions of copper nitrate and potassium nitrate. The resulting mixture is dried, molded into pills or lumps of any suitable size and shape, roasted at about 1000° F., reduced for about 4 hours at about 900° F. with about 1000 v./v./hr. of excess hydrogen and sintered for about 4 hours at about 1200° F. in a non-oxidizing atmosphere, for example of hydrogen.

In carrying out the hydrocarbon synthesis in the presence of catalysts of the type above described, conventional synthesis conditions for iron catalysts may be employed, for example temperatures of about 450°–800° F., preferably 500°–700° F., pressures of about 3–25 atm., $H_2$:CO ratios of about 0.6:1–3:1, and space velocities of about 100–2500 v./v./hr., in either fixed bed or fluid bed operation. In the latter case the catalysts may have a particle size falling within the wide range of 5–500 microns diameter while spheres of 5–200 microns diameter are preferably used at superficial gas velocities of 0.3–5 ft. per second.

The superiority of the new type iron spinel catalysts over a pure iron catalyst such as the $Fe^{++}Fe^{+++}$ spinel magnetite in the absence of carriers and promoters is illustrated by the typical experimental data listed in Table I below, which were obtained at optimum reaction temperatures for the individual catalysts.

*Table I*

|  | 1 Mol $Fe_2O_3$ + | | | |
|---|---|---|---|---|
|  | 1 mol MgO ($MgFe_2O_4$) | 1 mol ZnO ($ZnFe_2O_4$) | 1 mol CaO ($CaFe_2O_4$) | 1 mol FeO (Magnetite) |
| Catalyst Reduction | (1) | (1) | (1) | (1) |
| Catalyst Reduction Temp. °F | 900 | 900 | 900 | 900–1200 |
| Synthesis Gas Feed Rate, v./v./hr | 200 | 200 | 200 | 200 |
| Synthesis Pressure, p. s. i. g | 250 | 250 | 250 | 250 |
| Synthesis Temp. °F | 530 | 535 | 567 | 574 |
| $H_2$:CO Volume Ration in Synthesis Feed Gas | 1:1 | 1:1 | 1:1 | 1:1 |
| Vol. Percent $CO_2$ in Exit Gas | 48 | 49 | 46 | 29 |
| Percent CO Conversion | 96 | 96 | 94 | 78 |
| Measured Yield, (c. c./cu. m. feed) | 144 | 102 | 80 | 77 |
| Yield of $C_4$ and Higher Hydrocarbons (c. c./cu. m. $H_2$+CO Consumed) | 203 | 170 | 145 | 142 |

[1] Four hours with 1000 v./v./hr. excess $H_2$.

The above data show that the spinel-type catalysts of this invention give a CO conversion which is more than 20% higher than that obtainable when using pure iron spinel. Of particular importance are the high yields of liquid products produced by the zinc and magnesium spinels which surpass those of magnetite by more than 20% and 40%, respectively.

As indicated above a further advantage of the catalysts of the present invention resides in the fact that they may be supported on an excess of bivalent component to obtain supported catalysts of highest activity suitable for the hydrocarbon synthesis employing the fluid solids technique.

The data of Table II below illustrate the advantages of the use of the new catalysts over procedures using iron catalysts supported on different carriers such as alumina, silica microspheres, and silica-alumina microspheres, and iron catalysts free of carrier material. A series of tests carried out on such miscellaneous catalysts at 250 lbs./sq. in. pressure, 200 v./v./hr. space velocity, and 0.8–1.1 $H_2$:CO feed ratio and optimum reaction temperatures for the individual catalysts yielded the following results for fixed bed operation:

*Table II*

| Catalyst Composition Prior to Reduction at 900° F. and Sintering at 1,200° F. | Max. Measured Liquid Yield, c.c./cu.m. Syn. Gas (Input Basis) | Temp., °F. | Conv., percent [1] |
|---|---|---|---|
| 54% MgO, 40% $Fe_2O_3$, 5% CuO, 1% $K_2O$ | 126 | 517 | 90 |
| 90% $Fe_2O_3$, 10% $Al_2O_3$ (Mixed ppt.) | 72 | 547 | 90 |
| 69% $Al_2O_3$, 30% $Fe_2O_3$, 1% KCl | 44 | 592 | 75 |
| 68% $Fe_2O_3$ on 32% Alumina-Silica Microspheres | 39 | 552 | 70 |
| 45% $Fe_2O_3$ on 55% Silica Microspheres | 21 | 628 | 72 |
| Red $Fe_2O_3$ + 1% KCl | 139 | 517 | 96 |

[1] Estimated.

From the above data it will be seen that the process carried out in the presence of a magnesia-supported iron-magnesia spinel catalyst promoted with potassium and copper yields about 75% more liquid hydrocarbons than the process using the most active of the other carrier catalysts tested and closely approaches the yields obtainable with pure iron oxide promoted with KCl.

Fluidity tests carried out in a 1⅛″ Vycor tube using $H_2$ or $N_2$ as the fluidizing gas at superficial velocities of 0.3–0.5 ft. per second gave the following results:

*Table III*

| Catalyst | Size Microns | Bulk Density | Fluidity at 600° F. |
|---|---|---|---|
| 54% MgO, 40% $Fe_2O_3$, 5% CuO, 1% $K_2O$ | 5–125 | 0.90 | Good. |
| 32% Alumina-Silica Hydrogel, 68% $Fe_2O_3$ | 50–60 | 0.79 | Do. |
| 55% Silica gel, 45% $Fe_2O_3$ | 5–125 | 0.62 | Do. |
| Hematite | 5–75 | 2.4 | Poor. |
| Iron Powder | 5–75 | 2.4 | Do. |
| Magnetite | 5–75 | 2.4 | Do. |

The above table shows that the magnesia supported spinel catalyst of the invention has the same good characteristics for use in fluid catalyst systems as other carrier catalysts and is in this respect greatly superior to pure iron or iron oxide catalysts. Others of the spinel-type catalysts supported in bivalent components of low bulk density have similar good fluidity characteristics.

It has also been found that the utility of the spinel-type catalysts described above may be further substantially improved particularly with respect to liquid product selectivity and disintegration resistance when the spinel-type composites are subjected to fusion prior to use.

Improved fused spinel-type catalysts in accordance with the present invention may be obtained by preparing the promoted iron spinel composite as described above, subjecting the dried composites to fusion preferably in an electrical resistance furnace, cooling the melt and thereafter sizing and reducing the material as previously described. The components of the catalyst may also be combined in the fused state, for example the iron oxide may be fused, the spinel-forming component admixed with the melt and the promoter added either prior or after cooling. A typical method suitable for preparing catalysts of this type is as follows:

A solution of zinc and iron nitrates and a solution of sodium hydroxide were added simultaneously to water, maintaining a pH of 9–10. The final pH was adjusted to 6.5 with nitric acid. The precipitate was filtered, washed, reslurried, filtered and washed. The cake was impregnated with a solution of $K_2CO_3$, dried and calcined at 1600° F. Part of the catalyst was electrically fused by passing an electric current through the mixture until a molten ingot was obtained. The ingot was broken to provide particles of 4 to 12 mesh in size which were reduced for about 4 hours at about 900° F. with about 1000 v./v./hr. of excess hydrogen.

The high activity and selectivity of the fused spinel-type catalysts just described is illustrated by the comparative fixed bed single pass test data reported below.

*Table IV*

| Catalyst | Not Fused | | | Fused | | |
|---|---|---|---|---|---|---|
| | 33.6% ZnO / 65.4% $Fe_2O_3$ | 20.0% MgO / 79.0% $Fe_2O_3$ | 33.3% CuO / 66.7% $Fe_2O_3$ | 33.8% ZnO / 64.2% $Fe_2O_3$ | 19.8% MgO / 78.2% $Fe_2O_3$ | 32.6% CuO / 65.4% $Fe_2O_3$ |
| Promoter | 1% KF | 1% KF | Trace $K_2O$ | 2% $K_2CO_3$ | 2% $K_2CO_3$ | 2% $K_2CO_3$ |
| $H_2$:CO Ratio | | | 2:1 | | | |
| Feed Rate, v./v./hr. | | | 200 | | | |
| Pressure, p. s. i. g. | | | 250 | | | |
| Temperature, °F. | 565 | 610 | 520 | | 650 | |
| CO Conversion, Percent | 94 | 95 | 94 | 95 | 94 | 96 |
| $C_4$+Yield, c.c./cu.m. $H_2$+CO Consumed | 197 | 193 | 190 | 200+ | 200+ | 170 |

It will be observed that particularly the fused ZnO and MgO spinels compare very favorably with the corresponding unfused spinels with respect to CO-conversion and liquid product yields though slightly higher temperatures have to be used to obtain these results.

From the foregoing, it will be readily appreciated that the improved synthesis catalysts of the present invention combine highest activity and selectivity with satisfactory ease of fluidization. An additional advantage of the present invention resides in the fact that the yields of olefins and oxygenated compounds are appreciably higher than those obtainable with other carrier catalysts at similar reaction conditions. This combination of characteristics distinguishes the catalysts of the invention over any prior art synthesis catalyst of which the inventors are aware.

This application is a continuation-in-part of our copending application Serial No. 637,100 filed December 22, 1945, now abandoned.

The present invention is not to be limited to any theory of the mechanism of the process or catalysts nor to any examples given merely for illustrative purposes, but only by the following claims.

What is claimed is:

1. An improved process for producing valuable conversion products from CO and $H_2$ by a catalytic synthesis reaction which comprises contacting a gas containing CO and $H_2$ in proportions and at conditions conducive to the formation of normally liquid hydrocarbons with a dense, turbulent, fluidized mass of finely divided catalyst consisting essentially of a combination of at least about 5 weight per cent of a trivalent iron component, calculated on an oxide basis, with at least about an equimolecular amount of a bivalent metal component capable of forming a spinel type compound selected from the group consisting of the oxygen compounds of magnesium and zinc, said catalyst being obtained by subjecting a composite the oxide analysis of which approximates 54% MgO, about 40% $Fe_2O_3$, about 5% CuO and about 1% $K_2O$ to a reducing treatment with hydrogen at temperatures of about 600° to 1800° F.

2. An improved process for producing valuable conversion products from CO and $H_2$ by a catalytic synthesis reaction which comprises contacting a gas containing CO and $H_2$ in synthesis proportions at synthesis conditions with a dense turbulent fluidized mass of finely divided catalyst consisting essentially of an originally fused and reduced composite of at least about 5 weight per cent of a trivalent iron component calculated on an oxide basis and at least about an equimolecular amount of a bivalent metal component capable of forming a spinel type compound selected from the group consisting of magnesium and zinc, promoted with a minor amount of an alkali metal compound promoting the selectivity of the catalyst to normally liquid products.

3. The process of claim 2 in which said alkali metal is potassium.

4. The process of claim 2 in which said catalyst is obtained by a method comprising combining the trivalent iron component with the bivalent metal component and the alkali metal compound, fusing the combined product, cooling, sizing and reducing the fused material.

5. The process of claim 2 in which said combined product is calcined prior to fusing.

6. The process of claim 2 in which said catalyst is obtained by a method comprising fusing the trivalent iron component, adding the bivalent metal component to the melt, cooling and sizing the combined product and reducing the sized material in the presence of the alkali metal compound.

KENNETH K. KEARBY.
JAMES F. BLACK.

REFERENCES CITED

The following references are of record in the file of this patent:

UNITED STATES PATENTS

| Number | Name | Date |
|---|---|---|
| 1,680,807 | Schultze | Aug. 14, 1928 |
| 1,746,464 | Fischer et al. | Feb. 11, 1930 |
| 2,211,022 | Michael | Aug. 13, 1940 |
| 2,231,990 | Dreyfus | Feb. 18, 1941 |
| 2,254,806 | Michael | Sept. 2, 1941 |
| 2,292,570 | Klemm | Aug. 11, 1942 |
| 2,296,405 | Scheuermann | Sept. 22, 1942 |
| 2,299,806 | Dreyfus et al. | Oct. 27, 1942 |
| 2,360,787 | Murphree et al. | Oct. 17, 1944 |
| 2,369,106 | Heckel et al. | Feb. 6, 1945 |
| 2,383,643 | Fulton et al. | Aug. 28, 1945 |
| 2,395,876 | Kearby | Mar. 5, 1946 |
| 2,417,164 | Auber, Jr. | Mar. 11, 1947 |
| 2,445,345 | Byrns | July 20, 1948 |
| 2,447,029 | Roelen et al. | Aug. 17, 1948 |
| 2,451,040 | Murphree | Oct. 12, 1948 |
| 2,461,147 | Davies et al. | Feb. 8, 1949 |
| 2,479,879 | Teter | Aug. 23, 1949 |

FOREIGN PATENTS

| Number | Country | Date |
|---|---|---|
| 707,607 | France | July 10, 1931 |
| 449,274 | Great Britain | June 24, 1936 |